(12) United States Patent
Chakravarthy Dandangi et al.

(10) Patent No.: US 10,880,264 B1
(45) Date of Patent: Dec. 29, 2020

(54) CUSTOMER-SIDE AND PROVIDER-SIDE TRANSLATION OF INTERNET PROTOCOL ADDRESSES WITHOUT PRE-SHARED PREFIXES

(71) Applicant: Juniper Networks, Inc., Sunnyvale, CA (US)

(72) Inventors: Jeevan Madhu Chakravarthy Dandangi, Bangalore (IN); Neeraj Gupta, Bangalore (IN); Nithyananda Vishnu K S, Tamil Nadu (IN)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 16/162,226

(22) Filed: Oct. 16, 2018

(51) Int. Cl.
*G06F 15/16* (2006.01)
*H04L 29/12* (2006.01)
*H04L 29/06* (2006.01)

(52) U.S. Cl.
CPC ........ *H04L 61/251* (2013.01); *H04L 61/2517* (2013.01); *H04L 69/167* (2013.01); *H04L 69/169* (2013.01)

(58) Field of Classification Search
CPC .. H04L 61/251; H04L 61/2517; H04L 69/167
USPC ........................................... 709/245
See application file for complete search history.

(56) References Cited

U.S. PATENT DOCUMENTS

| | | | |
|---|---|---|---|
| 6,523,068 B1 | 2/2003 | Beser et al. | |
| 7,188,191 B1 | 3/2007 | Hovell et al. | |
| 7,277,453 B2 | 10/2007 | Chin et al. | |
| 7,764,686 B1 | 7/2010 | Toebes et al. | |
| 8,131,863 B2 | 3/2012 | Takeda et al. | |
| 8,498,295 B1 | 7/2013 | Saxena et al. | |
| 8,510,474 B2* | 8/2013 | Van Aken | ........... H04L 12/4633 370/466 |
| 8,798,060 B1 | 8/2014 | Vautrin et al. | |
| 8,861,525 B1 | 10/2014 | Durand et al. | |
| 2004/0052257 A1 | 3/2004 | Abdo et al. | |
| 2004/0162909 A1 | 8/2004 | Choe et al. | |

(Continued)

OTHER PUBLICATIONS

Brockners et al., "Gateway Initiated Dual-Stack Lite Deployment," draft-ietf-softwire-gateway-init-ds-lite-00, Internet-Draft, May 13, 2010, 15 pp.

(Continued)

*Primary Examiner* — Frantz B Jean
(74) *Attorney, Agent, or Firm* — Shumaker & Sieffert, P.A.

(57) ABSTRACT

A network device may receive an IPv6 packet that includes an IPv6 source address and an IPv6 destination address. The network device may determine, based on the IPv6 packet including an extension header that includes an address prefix option, whether to translate the IPv6 packet into an IPv4 packet. Additionally, based on a determination to translate the IPv6 packet into the IPv4 packet, the network device generates an IPv4 packet that includes an IPv4 source address and an IPv4 destination address. Because the PLAT unit may make the determination whether to translate the IPv6 packet into an IPv4 packet based on the IPv6 packet including the address prefix option instead of based on the IPv6 source address including a customer-translation (CLAT) source prefix, it may be unnecessary to distribute the CLAT source prefix to the network device.

15 Claims, 11 Drawing Sheets

(56) References Cited

U.S. PATENT DOCUMENTS

| | | | |
|---|---|---|---|
| 2006/0062248 A1 | 3/2006 | Huang et al. | |
| 2006/0227792 A1 | 10/2006 | Wetterwald et al. | |
| 2007/0160065 A1 | 7/2007 | Mundra et al. | |
| 2007/0198735 A1 | 8/2007 | Kim et al. | |
| 2010/0202459 A1 | 8/2010 | Tsuchiya et al. | |
| 2012/0005372 A1* | 1/2012 | Sarikaya | H04W 80/045 709/245 |
| 2012/0011234 A1* | 1/2012 | Xu | H04L 29/12915 709/221 |
| 2012/0110210 A1 | 5/2012 | Huang et al. | |
| 2012/0207168 A1 | 8/2012 | Kassi Lahlou et al. | |
| 2019/0020622 A1* | 1/2019 | Novo Diaz | H04L 61/1541 |

OTHER PUBLICATIONS

Carpenter et al., "Connection of IPv6 Domains via IPv4 Clouds," RFC 3056, Feb. 2001, 20 pp.

Deering, S. et al. "Internet Protocol, Version 6 (IPv6) Specification", Network Working Group, RFC 2460, The Internet Society, Dec. 1998, 37 pp.

Despres, "IPv6 Rapid Deployment on IPv4 Infrastructures (6rd)," RFC 5569, Jan. 2010, 11 pp.

Durand et al., "Dual-Stack Lite Broadband Deployments Following IPv4 Exhaustion," draft-ietf-softwire-dual-stack-lite-06, Internet-Draft, Aug. 11, 2010, 35 pp.

Hankins et al., "Dynamic Host Configuration Protocol for IPv6 (DHCPv6) Options for Dual-Stack Lite," draft-ietf-softwire-ds-lite-tunnel-option-03, Internet-Draft, Jun. 24, 2010, 9 pp.

Harrington, D. et al. "An Architecture for Describing Simple Network Management Protocol (SNMP) Management Frameworks", Network Working Group, RFC 3411, The Internet Society, Dec. 2002, 60 pp.

Postel, Jon, "Internet Protocol" Darpa Internet Program—Protocol Specification, RFC: 791, available at http://www.ietf.org/rfc/rfc791.txt, Sep. 1981, 49 pp.

PowerPoint presentation, "Softwires," G6 Association, dated Sep. 22, 2008, 7 pp., http://www.afrinic.net/training/presentation/Slides%20Softwires.pdf.

Townsley et al., "IPv6 Rapid Development on IPv4 Infrastructures (6rd)," draft-ietf-softwire-ipv6-6rd-10, May 19, 2010, 20 pp.

Wikipedia entry, "Path MTU Discovery," last modified Sep. 16, 2010, 2 pp., http://en.wikipedia.org/wiki/Path_MTU_Discovery, 2 pp.

Carpenter et al., "Transmission and Processing of IPv6 Extension Headers," Internet Engineering Task Force (IETF), Request for Comments: 7045, Dec. 2013, 11pp.

Bao et al., "IPv6 Addressing of IPv4/IPv6 Translators," Internet Engineering Task Force (IETF), Request for Comments: 6052, Oct. 2010, 19 pp.

* cited by examiner

```
+---+---+---+---+---+---+---+---+---+---+---+---+---+---+---+---+
|PL| 0--------------32--40--48--56--64--72--80--88--96--104---------|
+---+---+---+---+---+---+---+---+---+---+---+---+---+---+---+---+
|32|    prefix     |v4(32)         | u | suffix                    |
+---+---+---+---+---+---+---+---+---+---+---+---+---+---+---+---+
|40|    prefix      |v4(24)        | u |(8)| suffix                |
+---+---+---+---+---+---+---+---+---+---+---+---+---+---+---+---+
|48|    prefix          |v4(16) | u |  (16)  | suffix              |
+---+---+---+---+---+---+---+---+---+---+---+---+---+---+---+---+
|56|    prefix              |(8)| u |  v4(24)    | suffix          |
+---+---+---+---+---+---+---+---+---+---+---+---+---+---+---+---+
|64|    prefix                  | u |  v4(32)       | suffix       |
+---+---+---+---+---+---+---+---+---+---+---+---+---+---+---+---+
|96|    prefix                                  |   v4(32)         |
+---+---+---+---+---+---+---+---+---+---+---+---+---+---+---+---+
```

FIG. 6

CUSTOMER-SIDE AND PROVIDER-SIDE TRANSLATION OF INTERNET PROTOCOL ADDRESSES WITHOUT PRE-SHARED PREFIXES

TECHNICAL FIELD

The disclosure relates to computer networks and, more particularly, to Internet Protocol (IP) address translation in computer networks.

BACKGROUND

Internet protocol (IP) version 6 (IPv6) is designed as a replacement for IP version 4 (IPv4). Addresses used in IPv6 packets are each 128 bits. In contrast, addresses used in IPv4 packets are each 32 bits. IPv4 and IPv6 are not interoperable. For this reason, translation systems have been developed to allow IPv4 networks and IPv6 to work together. For example, 464-translation (i.e. IPv4 to IPv6 to IPv4 translation) allows devices in a customer-side IPv4 network to communicate via an intermediate IPv6 network with devices in a provider-side IPv4 network. In this example, a customer-side translator translates IPv4 packets in the customer network into IPv6 packets in the intermediate IPv6 network and IPv6 packets from the intermediate IPv6 network into IPv4 packets in the customer-side IPv4 network. Furthermore, in this example, a provider-side translator translates IPv6 packets from the intermediate IPv6 network into IPv4 packets in the provider IPv4 network and translates IPv4 packets in the provider IPv4 network to IPv6 packets for the intermediate IPv6 network.

SUMMARY

In general, the disclosure describes techniques for improving Internet Protocol (IP) address translation. More specifically, the disclosure describes techniques for improving 464-translation (i.e. IPv4 to IPv6 to IPv4 translation) without pre-shared IPv6 prefixes. In previous implementations of 464-translation, a provider-side translation (PLAT) unit determines whether to translate an IPv6 packet into an IPv4 packet based on whether an IPv6 source address of the IPv6 packet includes a customer-side translation (CLAT) source prefix recognized by the PLAT unit. However, distributing the CLAT source prefixes to PLAT units may impose a significant administrative burden, especially since there are millions of CLAT units connected to the modern internet.

Techniques of this disclosure may eliminate the administrative burden of distributing CLAT source prefixes to PLAT units. As described herein, an IPv6 packet from a CLAT unit to be translated by a PLAT unit includes an extension header that includes a special address prefix option. The PLAT unit may make the determination whether to translate the IPv6 packet into an IPv4 packet based on the IPv6 packet including the address prefix option. Because the PLAT unit may make the determination whether to translate the IPv6 packet into an IPv4 packet based on the IPv6 packet including the address prefix option instead of the IPv6 source address including a CLAT source prefix distributed to the PLAT unit by the service provider, it may be unnecessary for the service provider to distribute the CLAT source prefix to the PLAT unit. Techniques of this disclosure may apply in both wired line and wireless 464-translation deployments.

In one example, this disclosure describes a method for performing address translation, the method comprising: receiving, by a network device, an IPv6 packet that includes an IPv6 source address and an IPv6 destination address; determining, by the network device, based on the IPv6 packet including an extension header that includes an address prefix option, whether to translate the IPv6 packet into an IPv4 packet; based on a determination to translate the IPv6 packet into the IPv4 packet: determining, by the network device, an IPv4 source address; determining, by the network device, an IPv4 destination address based on the IPv6 destination address; and generating, by the network device, the IPv4 packet such that a source address field of the IPv4 packet specifies the IPv4 source address and a destination address field of the IPv4 packet specifies the IPv4 destination address.

In another examples, this disclosure describes a network device comprising: a network interface card configured to receive an IPv6 packet that includes an IPv6 source address and an IPv6 destination address; and one or more processors comprising circuitry configured to: determine, based on the IPv6 packet including an extension header that includes an address prefix option, whether to translate the IPv6 packet into an IPv4 packet; based on a determination to translate the IPv6 packet into the IPv4 packet: determine an IPv4 source address; determine an IPv4 destination address based on the IPv6 destination address; and generate the IPv4 packet such that a source address field of the IPv4 packet specifies the IPv4 source address and a destination address field of the IPv4 packet specifies the IPv4 destination address.

In another example, this disclosure describes a method comprising: receiving, at a network device, an IPv4 packet that includes an IPv4 source address and an IPv4 destination address; determining, by the network device, an IPv6 source address based on a CLAT source prefix and an IPv4 source address of an IPv4 packet; determining, by the network device, an IPv6 destination address based on a CLAT destination prefix and an IPv4 destination address of the IPv4 packet; generating, at the network device, an IPv6 packet having a source address field, a destination address field, and an extension header, wherein the source address field of the IPv6 packet contains the IPv6 source address, the destination address field of the IPv6 packet contains the IPv6 destination address, and the extension header includes an address prefix option specifying the CLAT source prefix or a length of the CLAT source prefix; and sending, by the network device, the IPv6 packet on an IPv6 network.

In another example, this disclosure describes a network device comprising: one or more processors comprising circuitry configured to: receive an IPv4 packet that includes an IPv4 source address and an IPv4 destination address; determine an IPv6 source address based on a CLAT source prefix and an IPv4 source address of an IPv4 packet; determine an IPv6 destination address based on a CLAT destination prefix and an IPv4 destination address of the IPv4 packet; generate an IPv6 packet having a source address field, a destination address field, and an extension header, wherein the source address field of the IPv6 packet contains the IPv6 source address, the destination address field of the IPv6 packet contains the IPv6 destination address, and the extension header includes an address prefix option specifying the CLAT source prefix or a length of the CLAT source prefix; and a network interface card configured to send the IPv6 packet on an IPv6 network.

The details of one or more examples are set forth in the accompanying drawings and the description below. Other features, objects, and advantages will be apparent from the description, drawings, and claims.

BRIEF DESCRIPTION OF DRAWINGS

FIG. 6 shows the IPv4-embedded IPv6 address format defined in RFC 6052.

DETAILED DESCRIPTION

Figure 1:
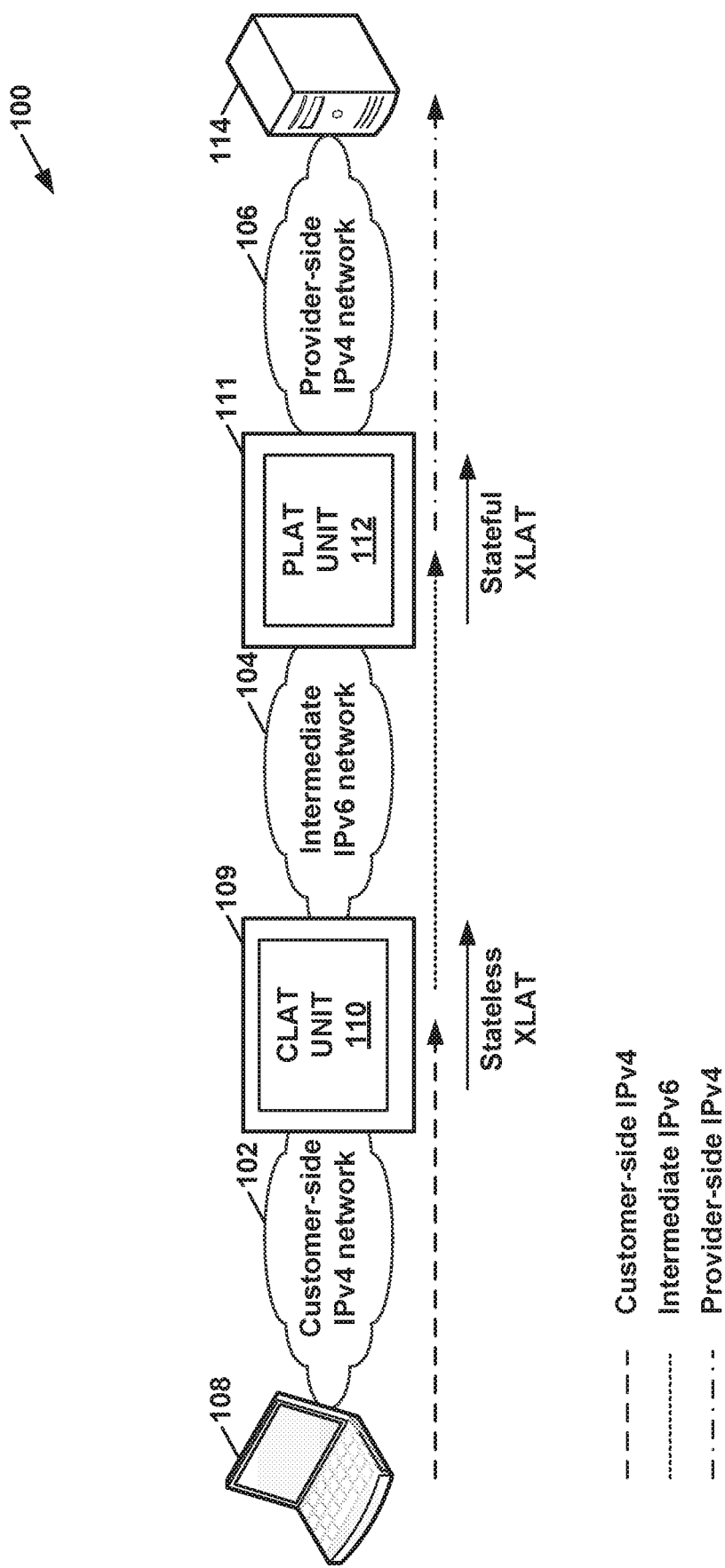
FIG. 1 is a block diagram illustrating an example system in which IPv4 to IPv6 to IPv4 translation is performed.

FIG. 1 is a block diagram illustrating an example system 100 in which IPv4 to IPv6 to IPv4 translation is performed. In the example of FIG. 1, system 100 includes a customer-side IPv4 network 102, an intermediate IPv6 network 104, and a provider-side IPv4 network 106. IPv4 network 102, intermediate IPv6 network 104, and provider-side IPv4 network 106 may be various types of networks. For example, customer-side IPv4 network 102 may be a private network, such as a local area network or an Internet Service Provider's (ISP's) network. In some examples, intermediate IPv6 network 104 is a public internet core network. Furthermore, in some examples, provider-side IPv4 network 106 is a public internet core network. In other examples, provider-side IPv4 network 106 is a private network.

Additionally, in the example of FIG. 1, system 100 includes a customer-side device 108, a first network device 109, a second network device 111, and a provider device 114.

Network device 109 implements a customer-side translator (CLAT) unit 110. Network device 111 implements a provider-side translator (PLAT) unit 112. In other examples, system 100 may include other devices, units, and networks. Provider device 114 may provide a service, such as a website, streaming service, or application programming interface (API). Customer-side device 108 may be a computing device that uses the service provided by provider device 114.

Although customer-side device 108 is illustrated in FIG. 1 as a laptop computer and provider device 114 is illustrated in FIG. 1 as a server device, customer-side device 108 may be any of a wide variety of different types of devices, including laptop computers, server devices, personal computers, tablet computers, smartphones, intermediate network devices, or other types of computing devices. Although customer-side device 108 is shown in the example of FIG. 1 as being the only device other than CLAT unit 110 connected to customer-side IPv4 network 102, one or more additional devices may also be connected to customer-side IPv4 network 102. Similarly, although provider device 114 is shown in the example of FIG. 1 as being the only device other than PLAT unit 112 connected to provider-side IPv4 network 106, one or more additional devices may also be connected to provider-side IPv4 network 106.

CLAT unit 110 and PLAT unit 112 may each be implemented by respective network devices 109 and 111. Network devices 109 and 111 implementing CLAT unit 110 and PLAT unit 112 may perform other functions, such as firewall functions, routing functions, gateway functions, and so on.

In the example of FIG. 1, CLAT unit 110 may receive IPv4 packets having IPv4 destination addresses corresponding to devices outside customer-side IPv4 network 104. In response to receiving such an IPv4 packet, CLAT unit 110 may perform a stateless 1:1 algorithmic IPv4 to IPv6 translation using a CLAT source prefix and a CLAT destination prefix. The CLAT source prefix may be delegated to CLAT unit 110 via a delegation mechanism, such as Dynamic Host Configuration Protocol version 6 (DHCPv6). CLAT unit 110 may determine the CLAT destination prefix in various ways, such as by using an Address Resolution Protocol. In some examples, CLAT unit 110 may be delegated a destination prefix by a mechanism such as DNS64.

PLAT unit 112 may receive the IPv6 packet via intermediate IPv6 network 104. In response to receiving the IPv6 packet, PLAT unit 112 may translate the IPv6 packet into an IPv4 packet. PLAT unit 112 may use the CLAT source prefix and the CLAT destination prefix to perform a stateful N:1 translation of IPv6 addresses to IPv4 addresses. PLAT unit 112 may output the IPv4 packet on provider-side IPv4 network 106. Provider device 114 may receive the IPv4 packet from provider-sider network 106. Thus, system 100 may be able to provide customer-side device 108 with end-to-end IPv4 connectivity with provider device 114 over an IPv6-only network (i.e., intermediate IPv6 network 104).

Figure 2:
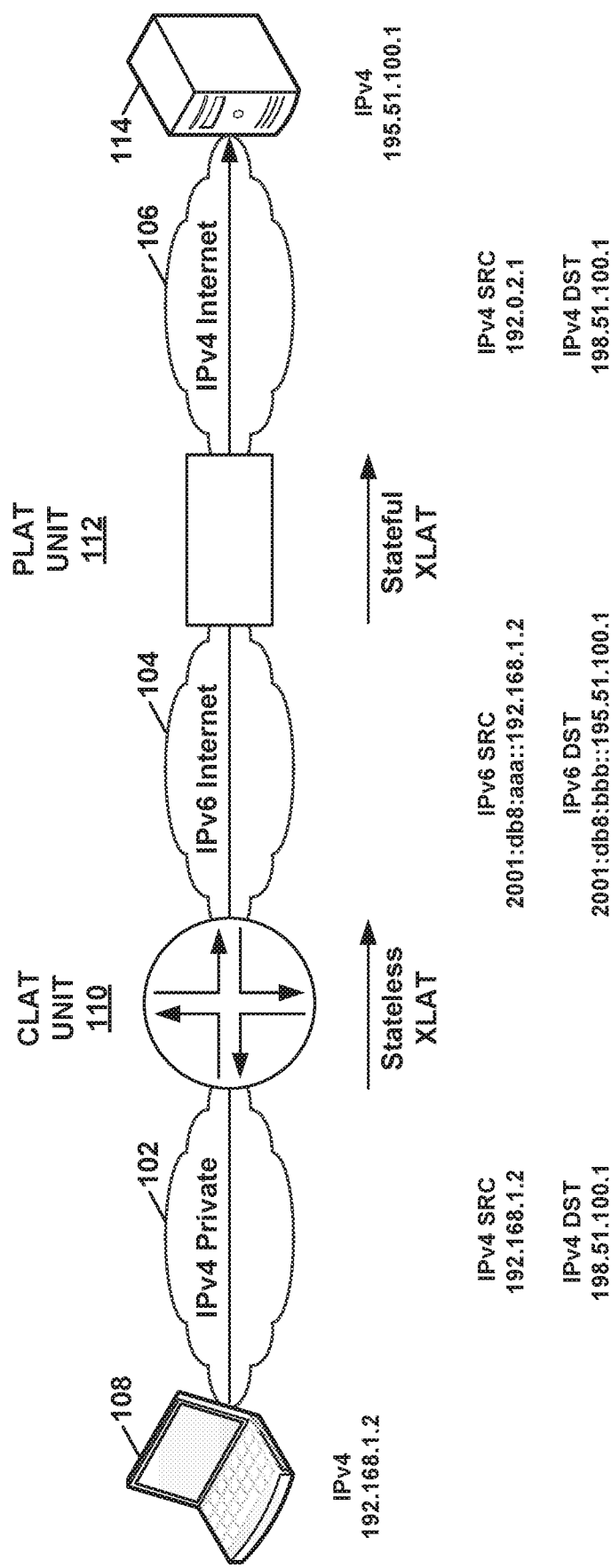
FIG. 2 is a block diagram illustrating an example of IPv4 to IPv6 to IPv4 translation.

FIG. 2 is a block diagram illustrating an example of IPv4 to IPv6 to IPv4 translation. In the example of FIG. 2, the IPv4 address of customer-side device 108 is 192.168.1.2 and the IPv4 address of provider device 114 is 198.51.100.1. To send a packet to provider device 114, customer-side device 108 may send an IPv4 packet on customer-side IPv4 network 102 that is received by CLAT unit 110. The IPv4 packet sent by customer-side device 108 may specify the IPv4 address of provider device 114 (198.51.100.1) as the destination address and may specify the IPv4 address of customer-side device 108 (192.168.1.2) as the source address.

As shown in the example of FIG. 2, CLAT unit 110 may be configured with a CLAT source prefix (e.g., a translation (XLAT) source (SRC) prefix) 2001:db8:aaa::/96 and a CLAT destination prefix (e.g., a XLAT destination (DST) prefix) 2001:db8:bbb::/96. In response to receiving the IPv4 packet generated by customer-side device 108, CLAT unit 110 may generate an IPv6 packet and may send the IPv6 packet on intermediate IPv6 network 104. CLAT unit 110 may generate the IPv6 packet such that the CLAT source prefix and the IPv4 source address are embedded in a source address of the IPv6 packet (i.e., the IPv6 source address). Thus, the IPv6 packet may have a source address of 2001:db8:aaa::192.168.1.2. The CLAT destination prefix and the IPv4 destination address of the IPv4 packet may be embedded in the destination address of the IPv6 packet (i.e., the IPv6 destination address). Thus, the IPv6 packet may have an IPv6 destination address of 2001:db8:bbb::195.51.100.1. CLAT unit 110 may perform IPv4 to IPv6 translation in this way for any IPv4 packet arriving from customer-side IPv4 network 102 without respect to state. Hence, the translation performed by CLAT unit 110 may be considered stateless.

PLAT unit 112 may receive the IPv6 packet generated by CLAT unit 110. In response to receiving the IPv6 packet, PLAT unit 112 may make a determination whether to translate the IPv6 packet into an IPv4 packet. If PLAT unit 112 makes the determination to translate the IPv6 packet into an IPv4 packet, PLAT unit 112 may generate the IPv4 packet such that the IPv4 source address is an IPv4 address in a pool of IPv4 source addresses associated with PLAT unit 112. For instance, in the example of FIG. 2, PLAT unit 112 is associated with an IPv4 source address pool that ranges from 192.0.2.1 to 192.0.2.100. Thus, as shown in the example of FIG. 2, PLAT unit 112 may set the IPv4 source address to 192.0.2.1. The IPv4 source address pool may be of sufficient size that each customer-side device expected to be concurrently in communication with devices in provider-side IPv4 network 106 may be associated with a different IPv4 address in the IPv4 source address pool.

Furthermore, as part of translating the IPv6 packet into the IPv4 packet, PLAT unit 112 may convert the IPv6 destination address to an IPv4 destination address. PLAT unit 112 may convert the IPv6 destination address to the IPv4 destination address by extracting the embedded IPv4 destination address from the IPv6 destination address. Thus, in the example of FIG. 2, the IPv4 destination address may be 195.51.100.1, which is the same as the IPv4 destination address of the IPv4 packet sent by customer-side device 108. Provider device 114 may then receive the IPv4 packet generated by PLAT unit 112

As noted above, PLAT unit 112 may make a determination of whether to translate an IPv6 packet into an IPv4 packet. In some previous solutions, a PLAT unit determines whether to translate the IPv6 packet into an IPv4 packet based on the IPv6 source address including a CLAT source prefix distributed by an administrator of provider devices to PLAT units. In another previous solution, a PLAT unit determines whether to translate the IPv6 packet into an IPv4 packet based on the IPv6 source address ending with a particular code. For instance, in the ANDROID™ operating system, CLAT units append the suffix "::464" to IPv6 addresses.

This disclosure describes techniques that may improve on the existing solutions for 464-translation. For example, in accordance with the techniques of this disclosure, it may be unnecessary for administrators of PLAT units to distribute CLAT source prefixes to PLAT units, such as PLAT unit 112. Distributing CLAT source prefixes to PLAT units may be burdensome because there are millions of deployed network devices implementing CLAT units. Thus, in previous solutions that rely on PLAT units recognizing CLAT source prefixes, a PLAT unit may need to be configured with a very large number of CLAT source prefixes, which may occupy considerable space in a memory of the PLAT unit. The techniques of this disclosure may reduce or eliminate the memory storage requirements associated with storing large numbers of CLAT source prefixes. Additionally, distribution of CLAT source prefixes may add significant administrative overhead to service providers who administer PLAT units. However, failure to share a CLAT source prefix with PLAT units or incorrect configuration of CLAT source prefixes at PLAT units may cause 464-translation to fail. Furthermore, distributing CLAT source prefixes to PLAT units may slow the turnaround time for deploying a CLAT unit because it may be necessary for the CLAT source prefix associated with the CLAT unit to be distributed to PLAT units before the CLAT unit can be used for 464-translation. The techniques of this disclosure may reduce the turnaround time for deploying a CLAT unit because the techniques of this disclosure may not require distributing CLAT source prefixes to PLAT units.

Furthermore, in accordance with the techniques of this disclosure, it may be unnecessary for IPv6 source addresses to have suffixes specifying the particular code. Requiring IPv6 source addresses to end with a particular code (e.g., "::464") may limit the range of CLAT source prefixes that may be used. For example, requiring IPv6 source addresses to end with a particular code may prevent the CLAT source prefix from having 96 bits.

As described in this disclosure, CLAT unit 110 may receive an IPv4 packet that includes an IPv4 source address and an IPv4 destination address. CLAT unit 110 may then determine an IPv6 source address based on a CLAT source prefix and an IPv4 source address of an IPv4 packet. Additionally, CLAT unit 110 may determine an IPv6 destination address based on a CLAT destination prefix and an IPv4 destination address of the IPv4 packet. CLAT unit 110 may generate an IPv6 packet having a source address field, a destination address field, and an extension header. The extension header may be a hop-by-hop extension header. The hop-by-hop extension header allows the IPv6 packet to be forwarded by intermediate devices even when there are unknown headers present in the hop-by-hop extension header. The source address field of the IPv6 packet contains the IPv6 source address. The destination address field of the IPv6 packet contains the IPv6 destination address. The hop-by-hop options extension header of the IPv6 packet includes an address prefix option that may specify the CLAT source prefix or a length of the CLAT source prefix. In some examples, the value of the address prefix option may be 0 or 1, with or without semantics attached to those values. CLAT unit 110 may send the IPv6 packet on intermediate IPv6 network 104. Because the IPv6 packet includes the address prefix option specifying the CLAT source prefix or the length of the CLAT source prefix, PLAT unit 112 may make the determination whether to translate the IPv6 packet into an IPv4 packet without needing to use the IPv6 source address to determine whether to translate the IPv6 packet into the IPv4 packet.

Furthermore, as described in this disclosure, PLAT unit 112 may receive an IPv6 packet that includes an IPv6 source address and an IPv6 destination address. In this example, PLAT unit 112 may determine, based on the IPv6 packet including an extension header that includes an address prefix option, whether to translate the IPv6 packet into an IPv4 packet. Furthermore, based on a determination to translate the IPv6 packet into the IPv4 packet, PLAT unit 112 may determine an IPv4 source address. For example, PLAT unit 112 may determine the IPv4 source address from a pool of IPv4 addresses. Additionally, PLAT unit 112 may determine an IPv4 destination address based on the IPv6 destination address. PLAT unit 112 may generate the IPv4 packet such that a source address field of the IPv4 packet specifies the IPv4 source address and a destination address field of the IPv4 packet specifies the IPv4 destination address.

Figure 3:
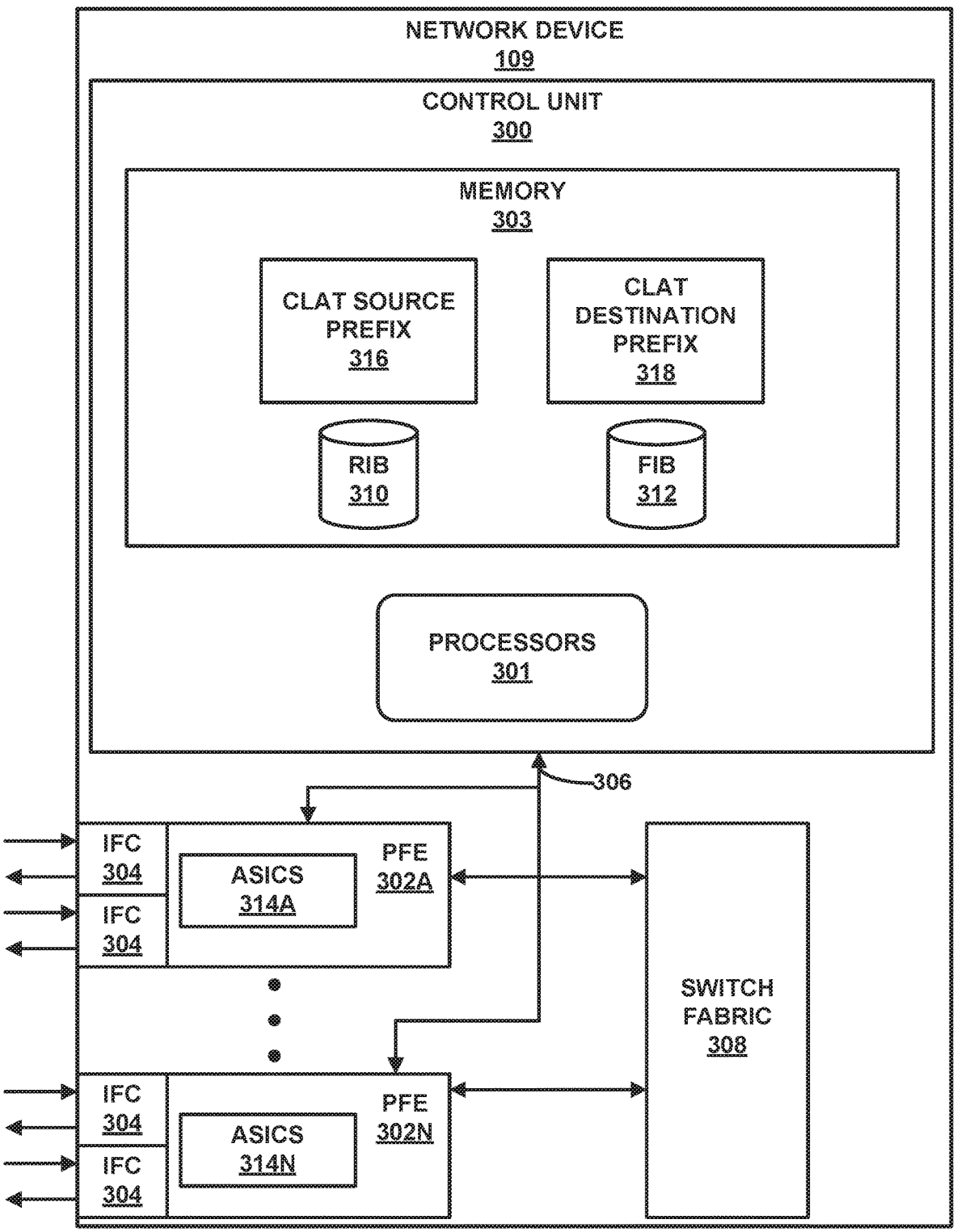
FIG. 3 is a block diagram illustrating example components of a network device that implements a customer-side translation (CLAT) unit.

FIG. 3 is a block diagram illustrating example components of a network device 109 that implements CLAT unit 110. Network device 109 may be a firewall device, network gateway device, a router device, a server computer, or another type of computing device configured for network communication. In the example of FIG. 3, network device 109 includes control unit 300 that provides control plane functionality for network device 109. Network device 109 also includes a plurality of packet processors, such as packet-forwarding engines 302A-302N ("PFEs 302") and a switch fabric 118 that collectively provide a data plane for forwarding network traffic. PFEs 302 receive and send data packets via network interface cards 304 ("IFCs 304"). In other embodiments, each of PFEs 302 may comprise more or fewer IFCs. Although not shown, PFEs 302 may each comprise a central processing unit (CPU) and a memory. In this example, control unit 300 is connected to each of PFEs 302 by a dedicated internal communication link 306. For example, dedicated link 306 may comprise a Gigabit Ethernet connection. Switch fabric 308 provides a high-speed interconnect for forwarding incoming data packets between PFEs 302 for transmission over a network.

Control unit 300 may be implemented solely in software, or hardware, or may be implemented as a combination of software, hardware or firmware. In the example of FIG. 3, control unit 300 includes one or more processors 301 and a memory 303. Processors 301 comprise circuitry configured to perform particular functions, such as execute software instructions. In that case, control unit 300 may include various software modules or daemons (e.g., one or more routing protocol processes, user interfaces and the like), and control unit 302 may include a computer-readable storage medium, such as computer memory or hard disk, for storing executable instructions.

Control unit 300 may maintain routing information in the form of routing information base (RIB) 310 that describes a topology of a network, and derives a forwarding information base (FIB) 312) in accordance with the routing information. In the example of FIG. 3, memory 303 stores RIB 310 and FIB 312. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 312 is generated based on selection of certain routes within the network and maps packet key information (e.g., destination information and other select information from a packet header) to one or more specific next hops and ultimately to one or more specific output interface ports of IFCs 304. Control unit 300 may generate FIB 312 in the form of a radix tree having leaf nodes that represent destinations within the network.

Control unit 300 communicates data representative of a software copy of FIB 312 into each of PFEs 302 to control forwarding of traffic within the data plane. This allows the software FIB stored in memory (e.g., RAM) in each of PFEs 302 to be updated without degrading packet-forwarding performance of router 80. In some instances, routing component 86 may derive separate and different software FIBs for each respective PFEs 302. In addition, one or more of PFEs 302 include application-specific integrated circuits (ASICs 116) that PFEs 302 program with a hardware-copy of the FIB based on the software FIBs (i.e., hardware versions of the software IBs) copied to each respective PFEs 302.

For example, a kernel executes on processors 301 and may comprise, for example, a UNIX operating system derivative such as Linux or Berkeley Software Distribution (BSD).

Microprocessors 301 may program PFEs 302 to install copies of the FIB 312. Microprocessors 301 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 314 are microcode-controlled chipsets (i.e., forwarding circuits) programmably configured by a slave microprocessor executing on each of PFEs 302. When forwarding packets, control logic with each ASIC 314 traverses the forwarding information (FIB 312) received from control unit 300 and, upon reaching a FIB entry for the packet (e.g., a leaf node), microcode-implemented control logic automatically selects a forwarding next hop and processes the packets in accordance with the operations defined within the next hop. In this way, ASICs 314 of PFEs 302 process packets by performing a series of operations on each packet over respective internal packet forwarding paths as the packets traverse the internal architecture of network device 109. Operations may be performed, for example, on each packet based on any of a corresponding ingress interface, an ingress PFE 302, an egress PFE 302, an egress interface or other components of network device 109 to which the packet is directed prior to egress, such as one or more service cards. PFEs 302 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 302 arranges forwarding structures as next hop data that can be chained together as a series of "hops" along an internal packet forwarding path for the network device. In many instances, the forwarding structures perform lookup operations within internal memory of ASICs 314, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 314 determines the way a packet is forwarded or otherwise processed by PFEs 302 from its input interface on one of IFCs 304 to its output interface on one of IFCs 304.

The architecture of network device 109 illustrated in FIG. 3 is shown for example purposes only. This disclosure is not limited to this architecture. In other examples, network device 109 may be configured in a variety of ways. In one example, some of the functionally of control unit 300 may be distributed within IFCs 304. Control unit 300 may be implemented solely in software, or hardware, or may be implemented as a combination of software, hardware, or firmware. For example, control unit 300 may comprise one or more of a processor, a programmable processor, a general purpose processor, processing circuitry, an integrated circuit, an Application Specific Integrated Circuit (ASIC), a Field Programmable Gate Array (FPGA), or any type of hardware unit capable of implementing the techniques described herein. Control unit 300 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein. Memory 303 may be formed by any of a variety of memory devices, such as dynamic random access memory (DRAM), including synchronous DRAM (SDRAM), magnetoresistive RAM (MRAM), resistive RAM (RRAM), or other types of memory devices.

In the example of FIG. 3, memory 303 may store a CLAT source prefix 316 and a CLAT destination prefix 318. Control unit 300 or PFEs 302 may implement CLAT unit 110 (FIG. 1). For instance, control unit 300 may provide CLAT source prefix 316 and CLAT destination prefix 318 to PFEs 302. PFEs 302 may use CLAT source prefix 316 and CLAT destination prefix 318 to perform 464-translation.

Figure 4:
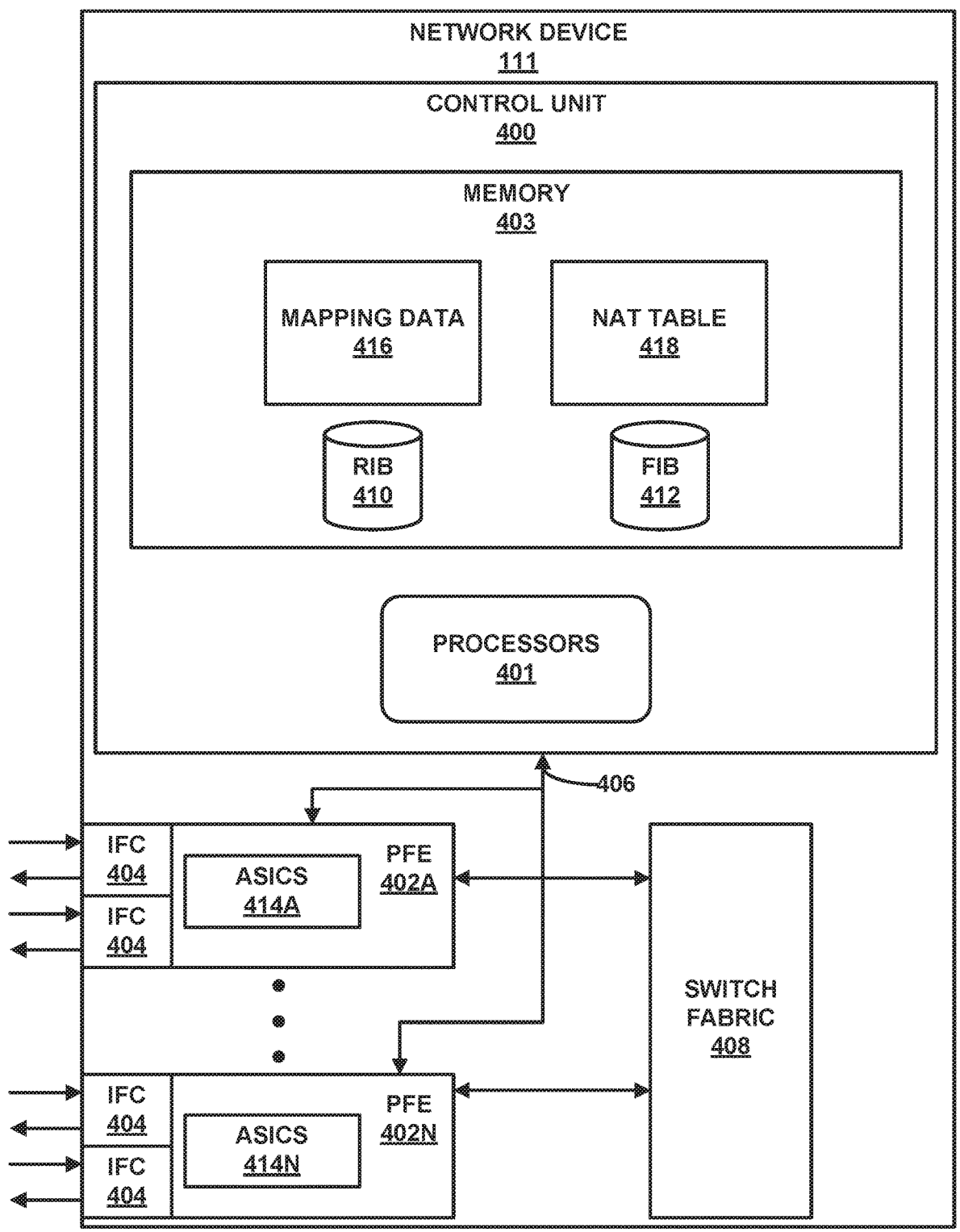
FIG. 4 is a block diagram illustrating example components of a network device that implements a provider-side translation (PLAT) unit.

FIG. 4 is a block diagram illustrating example components of a network device 111 that implements PLAT unit 112. Network device 111 may be a firewall device, network gateway device, a router device, a server computer, or another type of computing device configured for network communication.

In the example of FIG. 4, network device 111 includes a control unit 400, PFEs 402, dedicated link 406, and switch fabric 408. PFEs 402 may include IFCs 404 and ASICs 414.

Control unit 400 may include processors 401 and a memory 403. In the example of FIG. 4, memory 303 may store a RIB 410, FIB 412, mapping data 416 and a Network Address Translation (NAT) table 418. Control unit 400, PFEs 402, dedicated link 406, switch fabric 408, IFCs 404, ASICs 414, processors 401, memory 403, RIB 410, and FIB 412 may be implemented in the same way as corresponding units described in FIG. 3. Control unit 400 and/or PFEs 402 may implement PLAT unit 112 (FIG. 1). For example, control unit 400 may generate mapping data 416 and NAT table 418 and provide mapping data 416 and NAT table 418 to PFEs 402. PFEs 402 may use mapping data 416 and NAT table 418 to perform 464-translation.

As described in greater detail elsewhere in this disclosure, mapping data 416 may associate IPv4 source addresses with CLAT source prefixes. Furthermore, as described in greater detail elsewhere in this disclosure, NAT table 418 may contain entries mapping IPv4 address/port number combinations to other IPv4 address/port number combinations.

Figure 5:
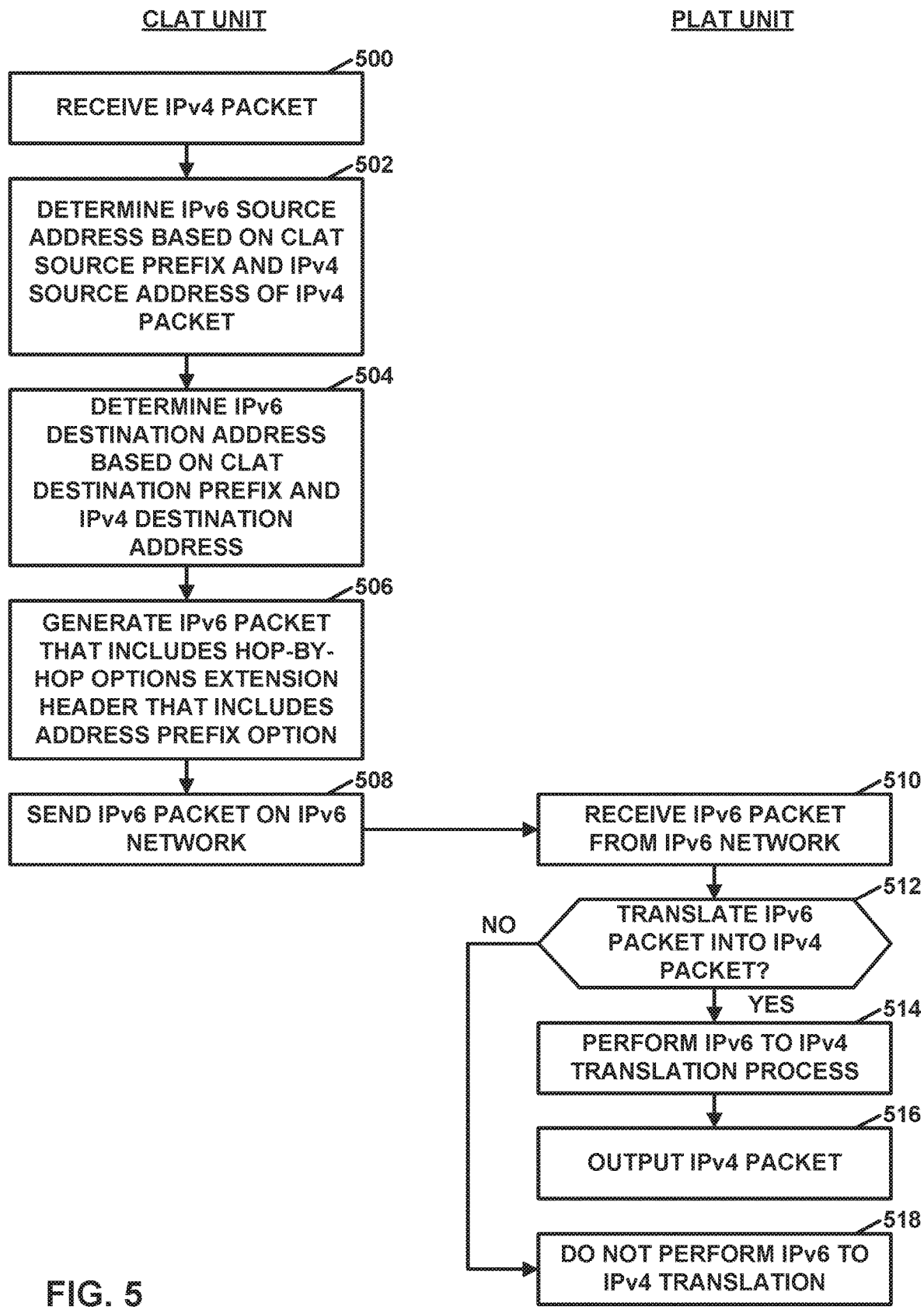
FIG. 5 is a flowchart illustrating an example operation of a CLAT unit and a PLAT unit that may be performed in response to the CLAT unit receiving an IPv4 packet.

FIG. 5 is a flowchart illustrating an example operation of CLAT unit 110 and PLAT unit 112 that may be performed in response to CLAT unit 110 receiving an IPv4 packet. The flowcharts of this disclosure are provided as examples. In other examples, operations may include more, fewer, or different actions. In other examples, particular actions may be performed in different orders or in parallel. Furthermore, in flowcharts where actions of both CLAT unit 110 and PLAT unit 112 are shown, CLAT unit 110 may perform the actions shown in the flowchart while PLAT unit 112 performs actions different from those shown in the flowchart, and vice versa.

In the example of FIG. 5, CLAT unit 110 may receive an IPv4 packet (500). In some examples, CLAT unit 110 receives the IPv4 packet from an IPv4 network such as customer-side IPv4 network 102 (FIG. 1, FIG. 2). In other examples, CLAT unit 110 receives the IPv4 packet from a memory (e.g., memory 303 of FIG. 3) or another software process operating in the same network device (e.g., network device 109 of FIG. 3) as CLAT unit 110.

In response to receiving the IPv4 packet, CLAT unit 110 may determine an IPv6 source address based on CLAT source prefix 316 (FIG. 3) and an IPv4 source address of the IPv4 packet (502). As shown in the example of FIG. 3, memory 303 of network device 109 may store CLAT source prefix 316. In this example, CLAT unit 110 may generate the IPv6 source address such that the IPv6 source address conforms to the IPv4-embedded IPv6 address format specified by C. Bao et al., "IPv6 Addressing of IPv4/IPv6 Translators," Internet Engineering Task Force (IETF) Request for Comments 6052, October 2010 (hereinafter, "RFC 6052"). In the IPv4-embedded IPv6 address format specified by RFC 6052, an IPv4-embedded IPv6 address is an IPv6 address composed of a variable-length prefix, an embedded IPv4 address, and a variable-length suffix. FIG. 6 shows the IPv4-embedded IPv6 address format defined in RFC 6052. As shown in FIG. 6, "prefix" denotes the variable-length prefix, "v4" denotes the embedded IPv4 address, "suffix" denotes the variable-length suffix, and "u" denotes reserved bits. As shown in FIG. 6, the locations of bits storing the embedded IPv4 address are dependent on the length of the prefix. Thus, in instances where the prefix is 32 bits long, the embedded IPv4 address is in bits 32 through 64; in instances where the prefix is 40 bits long, the embedded IPv4 address is in bits 40-63 and 72-79; in instances where the prefix is 48 bits long, the embedded IPv4 address is in bits 48-63 and 72-87; in instances where the prefix is 56 bits long, the embedded IPv4 address is in bits 56-63 and 72-95; in instances where the prefix is 64 bits long, the embedded IPv4 address is in bits 72-103; and in instances where the prefix is 96 bits long, the embedded IPv4 address is in bits 96-127.

Thus, in examples where memory 303 of network device 109 stores CLAT source prefix 316 and CLAT unit 110 generates the IPv6 source address such that the IPv6 source address conforms to the IPv4-embedded IPv6 address format specified by RFC 6052, CLAT unit 110 may generate the IPv6 source address such that CLAT source prefix 316 is stored in the bit locations specified by RFC 6052 for the prefix and such that the IPv4 source address is stored in the bits locations specified by RFC 6052 for the embedded IPv4 address. For instance, if CLAT source prefix 316 is 48 bits long, CLAT unit 110 may store CLAT source prefix 316 at bits 0-47 of the IPv6 source address and may store the IPv4 source address at bits 48-63 and 72-87 of the IPv6 source address.

In some examples, CLAT unit 110 uses Dynamic Host Configuration Protocol (DHCP) process to receive CLAT source prefix 316 from a server. In some examples, CLAT unit 110 is manually configured with CLAT source prefix 316.

Additionally, in the example of FIG. 5, CLAT unit 110 may determine an IPv6 destination address based on CLAT destination prefix 318 (FIG. 3) and an IPv4 destination address of the IPv4 packet (504). For example, CLAT unit 110 may generate the IPv6 destination address such that the IPv6 destination address conforms to the IPv4-embedded IPv6 address format specified by RFC 6052. Thus, in an example where CLAT unit 110 generates the IPv6 destination address such that the IPv6 destination address conforms to the IPv4-embedded IPv6 format specified by RFC 6052, CLAT unit 110 may generate the IPv6 destination address such that CLAT destination prefix 318 is stored in the bit locations specified by RFC 6052 for the prefix and such that the IPv4 destination address is stored in the bits locations specified by RFC 6052 for the embedded IPv4 address. For instance, if the CLAT destination prefix is 48 bits long, CLAT unit 110 may store CLAT destination prefix 318 at bits 0-47 of the IPv6 destination address and may store the IPv4 destination address at bits 48-63 and 72-87 of the IPv6 destination address.

In accordance with a technique of this disclosure, CLAT unit 110 may generate an IPv6 packet that includes an extension header that includes an address prefix option (506). For instance, the IPv6 packet may include a hop-by-hop extension header that includes the address prefix option. In some examples, the address prefix option may specify CLAT source prefix 316. In some examples, the address prefix option may specify a length of CLAT source prefix 316.

The address prefix option may be formatted in a type-length-value (TLV) format. The type field of the address prefix option may specify a value (e.g., "CLAT") indicating that the IPv6 packet is the result of customer-side translation. The length field of the address prefix option may specify the length of the value field of the address prefix option. The value field of the address prefix option may specify CLAT source prefix 316 or the length of CLAT source prefix 316.

Additionally, the IPv6 packet has a source address field specifying the IPv6 source address and a destination address field specifying the IPv6 destination address. Thus, in this way, CLAT unit 110 may generate an IPv6 packet having a source address field, a destination address field, and an extension header, where the source address field of the IPv6 packet contains the IPv6 source address, the destination address field of the IPv6 packet contains the IPv6 destination address, and the extension header includes an address prefix option specifying CLAT source prefix 316 or a length of CLAT source prefix 316. As noted elsewhere in this disclosure, the extension header may be a hop-by-hop extension header.

CLAT unit 110 may then send the IPv6 packet on intermediate IPv6 network 104 (508). For example, one of IFCs 304 of network device 109 (FIG. 3) may output the IPv6 packet on intermediate IPv6 network 104. PLAT unit 112 may receive the IPv6 packet sent by CLAT unit 110 on intermediate IPv6 network 104 (510). For example, one of IFCs 404 of network device 111 (FIG. 4) that implements PLAT unit 112 may receive the IPv6 packet. In some examples, intermediate devices between CLAT unit 110 and PLAT unit 112 may ignore the address prefix option in the extension header of the IPv6 packet.

In response to receiving the IPv6 packet, PLAT unit 112 may determine, based on the IPv6 packet including an extension header that includes an address prefix option, whether to translate the IPv6 packet into an IPv4 packet (512). For example, PLAT unit 112 may make the determination to translate the IPv6 packet into an IPv4 packet in response to determining that an extension header of the IPv6 packet includes an option of type "CLAT". When PLAT unit 112 makes the determination to translate the IPv6 packet into an IPv4 packet ("YES" branch of 512), PLAT unit 112 may perform an IPv6 to IPv4 translation process (514). Example IPv6 to IPv4 translation processes are described in this disclosure with respect to FIG. 7, FIG. 8, and FIG. 9.

PLAT unit 112 may then output an IPv4 packet generated by applying the IPv6 to IPv4 translation process (516). For example, one of IFCs 404 (FIG. 4) of network device 111 may output the IPv4 packet on provider-side IPv4 network 106. In another example, PLAT unit 112 may output the IPv4 packet for storage in a computer-readable storage medium, such as memory 403 (FIG. 4), for retrieval by another process operating on network device 111.

In the example of FIG. 5, when PLAT unit 112 makes the determination not to translate the IPv6 packet into an IPv4 packet ("NO" branch of 512), PLAT unit 112 does not perform the IPv6 to IPv4 translation process (516). PLAT unit 112 may perform various actions with the IPv6 packet when PLAT unit 112 makes the determination not to translate the IPv6 packet into an IPv4 packet. For example, PLAT unit 112 may discard the IPv6 packet. In another example, PLAT unit 112 may use the IPv6 packet internally without translating the IPv6 packet into an IPv4 packet.

Figure 7:
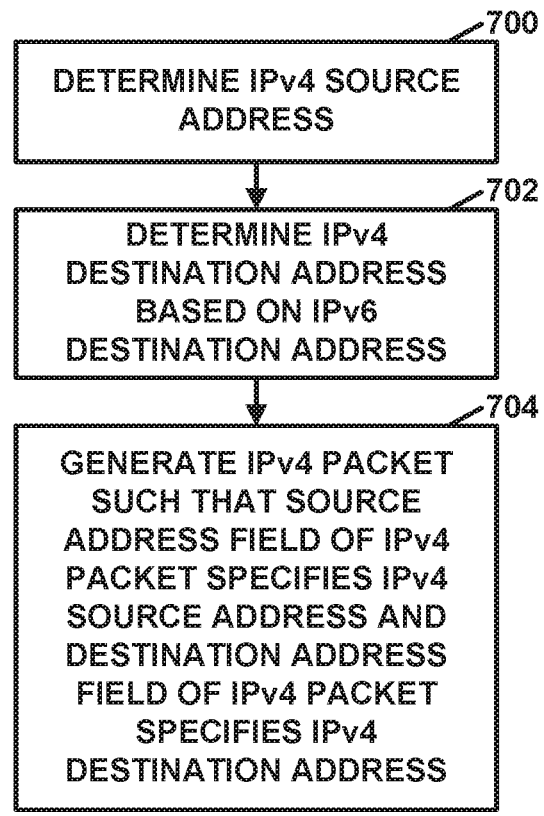
FIG. 7 is a flowchart illustrating an example IPv6 to IPv4 translation process in accordance with one or more techniques of this disclosure.

FIG. 7 is a flowchart illustrating an example IPv6 to IPv4 translation process in accordance with one or more techniques of this disclosure. In the example of FIG. 7, PLAT unit 112 may determine an IPv4 source address (700). PLAT unit 112 may determine the IPv4 source address in one of various ways. For example, PLAT unit 112 may determine the IPv4 source address by selecting the IPv4 source address from a pool of IPv4 addresses. For instance, in the example of FIG. 2, the pool of IPv4 addresses ranges from 192.01.2.1 to 192.0.2.100. In this example, PLAT unit 112 may select the IPv4 source address from available IPv4 addresses in the pool of IPv4 addresses in a numerical order, pseudorandom order, or according to another scheme.

In other examples, PLAT unit 112 may determine the IPv4 address based on the IPv6 source address of the IPv6 packet and the address prefix option of the IPv6 packet. For instance, in one example, the address prefix option of the IPv6 packet may explicitly specify the CLAT source prefix. In this example, the IPv6 source address of the IPv6 packet may be formatted according to RFC 6052. RFC 6052 specifies locations of bits within an IPv6 address that specify a prefix and locations of bits within the IPv6 address that specify an IPv4 address. RFC 6052 specifies different locations of the bits specifying the prefix and the IPv4 address depending on the length of the prefix. Accordingly, in this example, PLAT unit 112 may determine, based on the length of the CLAT source prefix specified by the address prefix option, the locations of bits within the IPv6 source address that store the IPv4 source address. PLAT unit 112 may copy the values of the bits at the determined locations within the IPv6 source address to determine the IPv4 source address. In some examples, the address prefix option of the IPv6 packet may specify a length of the CLAT source prefix. In such examples, PLAT unit 112 may determine the IPv4 source address in a similar way as the previous example.

Furthermore, in the example of FIG. 7, PLAT unit 112 may determine an IPv4 destination address based on the IPv6 destination address of the IPv6 packet (702). For example, PLAT unit 112 may be preconfigured with a CLAT destination prefix. CLAT unit 110 includes the CLAT destination prefix as a prefix in IPv6 destination addresses destined for provider device 114. In this example, the IPv6 destination address of the IPv6 packet may be formatted according to RFC 6052. RFC 6052 specifies locations of bits within an IPv6 address that specify a prefix and locations of bits within the IPv6 address that specify an IPv4 address. RFC 6052 specifies different locations of bits specifying the prefix and the IPv4 address depending on the length of the prefix. Accordingly, in this example, PLAT unit 112 may determine, based on the length of the preconfigured CLAT destination prefix, the locations of bits within the IPv6 destination address that store the IPv4 destination address. PLAT unit 112 may copy the values of the bits at the determined locations within the IPv6 destination address to determine the IPv4 destination address.

PLAT unit 112 may then generate an IPv4 packet such that a source address field of the IPv4 packet specifies the IPv4 source address and a destination address field of the IPv4 packet specifies the IPv4 destination address (704). For example, PLAT unit 112 may generate the IPv4 packet by writing data representing the IPv4 packet to a memory (e.g., memory 403) according to a format specified by the IPv4 communication protocol. In some examples, PLAT unit 112 generates the IPv4 packet such that the IPv4 packet does not include the address prefix option.

Figure 8:
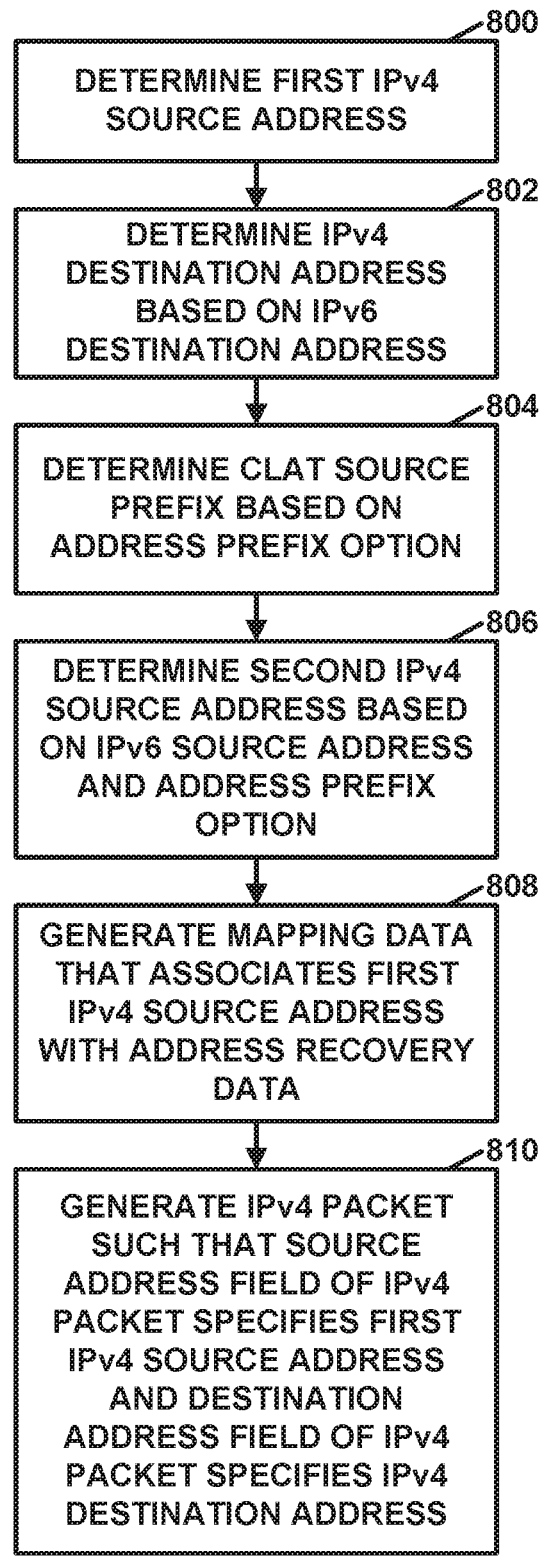
FIG. 8 is a flowchart illustrating an example IPv6 to IPv4 translation process in accordance with one or more techniques of this disclosure.

FIG. 8 is a flowchart illustrating an example IPv6 to IPv4 translation process in accordance with one or more techniques of this disclosure. In the example of FIG. 8, PLAT unit 112 may determine a first IPv4 source address (800). Additionally, PLAT unit 112 may determine an IPv4 destination address based on the IPv6 destination address of the IPv6 packet (802). PLAT unit 112 may determine the first IPv4 source address and the IPv4 destination address in the same manner as described above with respect to the IPv4 source address and the IPv4 destination address in FIG. 7.

In the example of FIG. 8, PLAT unit 112 determines a CLAT source prefix based on the address prefix option (804). PLAT unit 112 may determine the CLAT source prefix based on the address prefix option in one of various ways. For example, the address prefix option may explicitly specify the CLAT source prefix. In this example, determining the CLAT source prefix may simply involve parsing the address prefix option. In another example, the address prefix option may specify a length of the CLAT source prefix. In this example, PLAT unit 112 may determine, based on the length of the CLAT source prefix, locations of bits within the IPv6 source address that specify the CLAT source prefix. For example, RFC 6052 specifies a format that defines locations of bits within an IPv6 source address that specify address prefixes and locations of bits within the same IPv6 source address that specify an IPv4 address. In this example, PLAT unit 112 may use the format defined by RFC 6052 to determine the locations of bits within the IPv6 address that specify the CLAT source prefix. Specifying the length of the CLAT source prefix instead of explicitly specifying the CLAT source prefix may reduce the number of bits required to represent the address prefix option in the IPv6 packet, thereby potentially reducing demands on network bandwidth. However, specifying the length of the CLAT source prefix instead of explicitly specifying the CLAT source prefix may increase the number of steps performed by PLAT unit 112, potentially slowing the IPv6 to IPv4 translation process.

Additionally, in the example of FIG. 8, PLAT unit 112 may determine a second IPv4 source address based on the IPv6 source address and the address prefix option of the IPv6 packet (806). As noted above, in some examples, the PLAT unit 112 selects the first IPv4 source address from a pool of IPv4 addresses in response to receiving an IPv6 packet. Thus, a returning IPv4 packet received by PLAT unit 112 from provider-side IPv4 network 106 may include the IPv4 address selected from the pool as the IPv4 destination address. Therefore, PLAT unit 112 may need to determine the IPv4 source address embedded in the IPv6 source address (i.e., the second IPv4 source address) so that PLAT unit 112 is able to embed the IPv4 source address embedded in the IPv6 source address into an IPv6 destination address of an IPv6 packet PLAT unit 112 sends on intermediate IPv6 network 104. In examples where PLAT unit 112 determines the first IPv4 source address based on the IPv6 source address and the address prefix option, the first and second IPv4 source addresses may be the same and PLAT unit 112 may skip action (806). In some examples, customer-side IPv4 network 104 is a private network and provider-side IPv4 network 106 is a public network. Hence, in such examples, the first IPv4 source address may be referred to as a public IPv4 address and the second IPv4 source address (i.e., the IPv4 address of a device in the private, customer-side IPv4 network 102) may be referred to as a private IPv4 address.

In one example, the address prefix option of the IPv6 packet may explicitly specify the CLAT source prefix. In this example, the IPv6 source address of the IPv6 packet may be formatted according to RFC 6052. RFC 6052 specifies locations of bits within an IPv6 address that specify a prefix and locations of bits within the IPv6 address that specify an IPv4 address. RFC 6052 specifies different locations of the bits specifying the prefix and the IPv4 address depending on the length of the prefix. Accordingly, in this example, PLAT unit 112 may determine, based on the length of the CLAT source prefix specified by the address prefix option, the locations of bits within the IPv6 source address that store the second IPv4 source address. PLAT unit 112 may copy the values of the bits at the determined locations within the IPv6 source address to determine the second IPv4 source address. In some examples, the address prefix option of the IPv6 packet may specify a length of the CLAT source prefix. In such examples, PLAT unit 112 may determine the second IPv4 source address in a similar way as the previous example.

Furthermore, in the example of FIG. 8, PLAT unit 112 may generate mapping data that associates the first IPv4 source address with address recovery data (808). As noted above, in some examples, the PLAT unit 112 selects the IPv4 source address from a pool of IPv4 addresses in response to receiving an IPv6 packet. Thus, the IPv4 source address of an IPv4 packet sent by PLAT unit 112 on provider-side IPv4 network 106 does not necessarily match an IPv4 source address embedded in the IPv6 source address of the received IPv6 packet. However, when PLAT unit 112 receives an IPv4 packet back from provider device 114, the IPv4 destination address may be the IPv4 address selected from the pool. As described below with respect to action (1004) of FIG. 10, PLAT unit 112 may use the mapping data to determine the IPv4 address to be embedded in the IPv6 destination address. PLAT unit 112 may store data representing mapping data 416 in memory 403.

The mapping data may comprise a set of entries. In this example, each entry may specify an IPv4 address and address recovery data. Furthermore, in this example, PLAT unit 112 may generate the mapping data that associates the determined IPv4 source address with the CLAT source prefix by storing to memory 403 data representing an entry that specifies the determined IPv4 source address and the address recovery data. In some examples, the address recovery data comprises the CLAT source prefix and the second IPv4 source address. In some examples, the address recovery data comprises the IPv6 source address. Furthermore, in some examples, such as examples where the IPv4 source address of the IPv4 packet is extracted from the IPv6 source address, the address recovery data specifies the CLAT source prefix and not the IPv4 source address extracted from the IPv6 source address. In some examples, PLAT unit 112 does not generate new mapping data (e.g., generate a new entry in the set of mapping data) if the mapping data already includes an entry that specifies the first IPv4 source address.

Additionally, PLAT unit 112 may then generate an IPv4 packet such that a source address field of the IPv4 packet specifies the first IPv4 source address and a destination address field of the IPv4 packet specifies the IPv4 destination address (808). PLAT unit 112 may generate the IPv4 packet in the same manner as described above with respect to FIG. 7.

Figure 9:
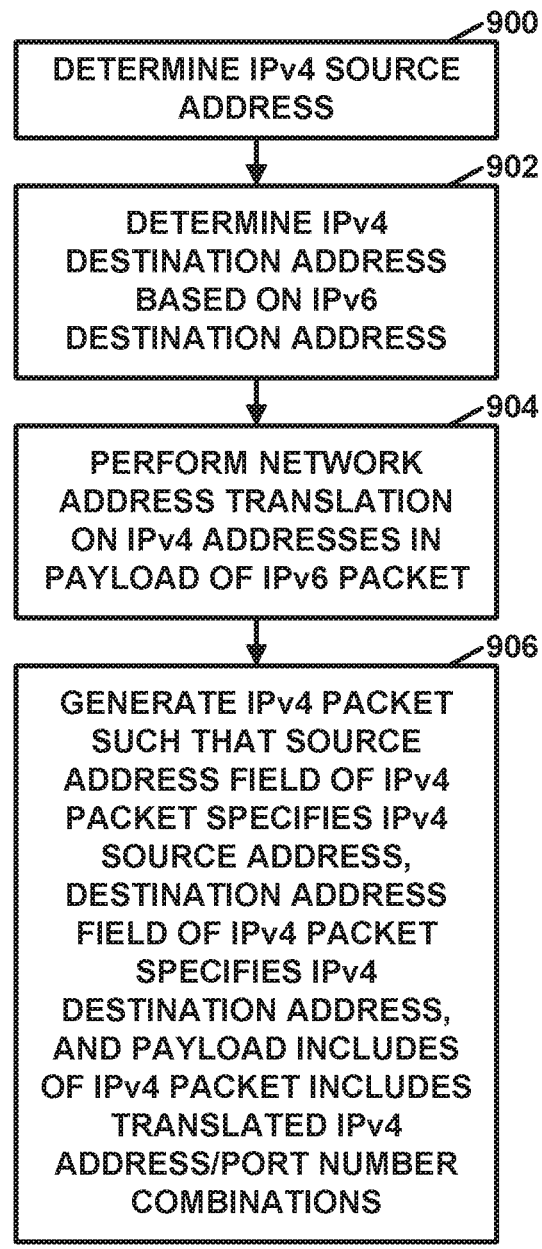
FIG. 9 is a flowchart illustrating an example IPv6 to IPv4 translation operation performed when an IPv6 packet is associated with application layer gateway (ALG) traffic, in accordance with one or more techniques of this disclosure.

FIG. 9 is a flowchart illustrating an example IPv6 to IPv4 translation operation performed when an IPv6 packet is associated with ALG traffic, in accordance with one or more techniques of this disclosure. In the example of FIG. 9, PLAT unit 112 may determine an IPv4 source address based on the IPv6 source address of the IPv6 packet and the address prefix option of the IPv6 packet (900). Additionally, PLAT unit 112 may determine an IPv4 destination address based on the IPv6 destination address of the IPv6 packet (902). PLAT unit 112 may determine the IPv4 source address and the IPv4 destination address in the same manner as described above with respect to FIG. 7 or FIG. 8. Furthermore, although not shown in the example of FIG. 9, PLAT unit 112 may, in some examples consistent with the example of FIG. 9, determine the CLAT source prefix, determine a second IPv4 source address, and generate the mapping data in the manner described above with respect to FIG. 8.

In the example of FIG. 9, based on the IPv4 packet being associated with ALG traffic, PLAT unit 112 may perform network address translation on IPv4 addresses and port numbers in a payload of the IPv6 packet (904). In some examples, PLAT unit 112 may identify ALG traffic based on the transport protocol (e.g., TCP/UDP) and the destination port number, which may be custom configured. PLAT unit 112 may perform the network address translation on the IPv4 addresses and the port numbers in one of various ways. For instance, as shown in the example of FIG. 4, memory 403 may store NAT table 418. NAT table 418 includes a set of NAT entries. Each NAT entry in NAT table 418 may specify a first IPv4 address/port number combination and a second IPv4 address/port number combination. In this example, for each IPv4 address/port number combination in the payload of the IPv6 packet for which PLAT unit 112 is to apply NAT, PLAT unit 112 may scan through NAT table 418 searching for a NAT entry that specifies the IPv4 address/port number combination in the payload of the IPv6 packet as a first IPv4 address/port number combination. In response to identifying a NAT entry that specifies the IPv4 address/port number combination in the payload of the IPv6 packet as the first IPv4 address/port number combination, PLAT unit 112 may replace the IPv4 address/port number combination in the payload of the IPv6 packet with the second IPv4 address/port number combination specified in the identified NAT entry. PLAT unit 112 may replace the IPv4 address/port number combination in the payload by overwriting the data in memory representing the existing IPv4 address/port number combination in the payload. Replacing IPv4 address/port number combinations in the payload may enable data belonging to particular protocols to pass through a firewall.

PLAT unit 112 may generate an IPv4 packet such that a source address field of the IPv4 packet specifies the IPv4 source address determined in action (900), a destination address field of the IPv4 packet specifies the IPv4 destination address determined in action (902), and a payload of the IPv4 packet includes the translated IPv4 address/port number combinations (906). PLAT unit 112 may generate the IPv4 packet by writing data representing the IPv4 packet to a memory according to a format specified by the IPv4 communication protocol.

Figure 10:
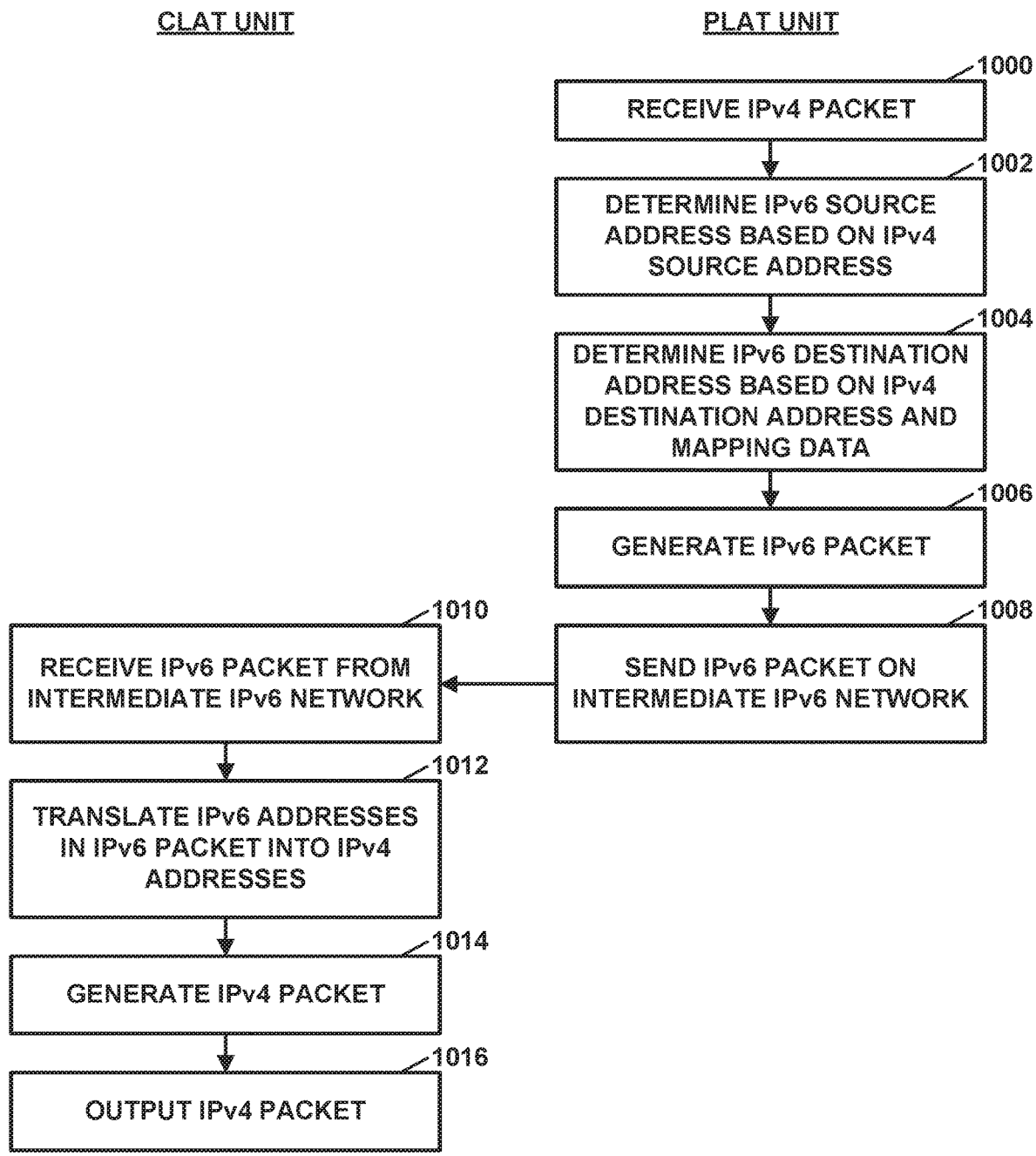
FIG. 10 is a flowchart illustrating an example operation of the CLAT unit and the PLAT unit that may be performed in response to the PLAT unit receiving an IPv4 packet.

FIG. 10 is a flowchart illustrating an example operation of CLAT unit 110 and PLAT unit 112 that may be performed in response to PLAT unit 112 receiving an IPv4 packet. In the example of FIG. 10, PLAT unit 112 receives an IPv4 packet (1000). In some examples, PLAT unit 112 receives the IPv4 packet from an IPv4 network such as provider-side IPv4 network 106 (FIG. 1). For instance, one of IFCs 404 of network device 111 (FIG. 4) implementing PLAT unit 112 may receive the IPv4 packet. In other examples, PLAT unit 112 may receive the IPv4 packet from a memory (e.g., memory 403) or another software process operating in the same network device as PLAT unit 112. A source address field of the IPv4 packet specifies an IPv4 source address. A destination address field of the IPv4 packet specifies an IPv4 destination address.

In response to receiving the IPv4 packet, PLAT unit 112 may determine an IPv6 source address based on the IPv4 source address (1002). For example, PLAT unit 112 may be preconfigured with a PLAT source prefix. In this example, the PLAT source prefix may match the CLAT destination prefix that CLAT unit 110 used to generate the IPv6 destination address. Furthermore, in this example, PLAT unit 112 may generate the IPv6 destination address by including the PLAT source prefix and the IPv4 source address in the IPv6 source address according to the format set forth in RFC 6052.

PLAT unit 112 may also determine an IPv6 destination address based on the IPv4 destination address and the mapping data (1004). For instance, in an example where the mapping data contains entries that map IPv4 addresses to IPv6 addresses, to determine the IPv6 destination address based on the IPv4 destination address and mapping data, PLAT unit 112 may scan through the entries in the mapping data for an entry that specifies the IPv4 destination address of the IPv4 packet. In this example, PLAT unit 112 may determine that the IPv6 destination address is the IPv6 address specified in the entry that specifies the IPv4 destination address of the IPv4 packet. In an example where the mapping data contains entries that maps first IPv4 addresses to CLAT source prefixes and second IPv4 addresses, PLAT unit 112 may scan through the entries in the mapping data for an entry that specifies the IPv4 destination address of the IPv4 packet as a first IPv4 address. Furthermore, in this example, PLAT unit 112 may determine locations of bits within the IPv6 destination address at which to store bits indicating the CLAT source prefix and the IPv4 destination address according to the format set forth in RFC 6052. In this example, PLAT unit 112 may then store data representing the CLAT source prefix and the IPv4 destination address at the determined locations.

In an example where PLAT unit 112 determines the IPv4 source address of the IPv4 packet by extracting the embedded IPv4 address from the IPv6 source address of an IPv6 packet when translating the IPv6 packet into the IPv4 packet, the address recovery data in the mapping data may simply be CLAT source prefixes. Thus, in this example, entries in the mapping data may map IPv4 addresses to CLAT source prefixes. Furthermore, in this example, to determine the IPv6 destination address, PLAT unit 112 may identify an entry in the mapping data that specifies the IPv4 destination address. PLAT unit 112 may then determine the IPv6 destination address such that the second IPv6 destination address includes the CLAT source prefix specified by the determined entry and includes the second IPv4 destination address. For instance, PLAT unit 112 may determine the IPv6 destination address by generating an IPv4-embedded IPv6 address according to the format set forth in RFC 6052 with the CLAT source prefix specified by the identified entry as the prefix and the IPv4 destination address as the IPv4 address.

PLAT unit 112 may generate an IPv6 packet such that a source address field of the IPv6 packet specifies the IPv6 source address and a destination address field of the IPv6 packet specifies the IPv6 destination address (1006). PLAT unit 112 may generate the IPv4 packet by writing data representing the IPv6 packet to a memory according to a format specified by the IPv6 communication protocol. PLAT unit 112 may then send the IPv6 packet on intermediate IPv6 network 104 (1008). For example, an IFC of a network device implementing PLAT unit 112 may transmit the IPv6 packet on intermediate IPv6 network 104.

Furthermore, in the example of FIG. 10, CLAT unit 110 may receive an IPv6 packet from intermediate IPv6 network 104 (1010). For instance, an IFC of a network device implementing PLAT unit 112 may receive the IPv6 packet.

In response to receiving the IPv6 packet, CLAT unit 110 may translate the IPv6 addresses in the IPv6 packet into IPv4 addresses (1012). For example, CLAT unit 110 may make a determination to translate the IPv6 address in the IPv6 packet into IPv4 addresses in response to determining that the IPv6 destination address is the CLAT source prefix that CLAT unit 110 uses to generate IPv6 source addresses.

To translate the IPv6 source address into the IPv4 source address, CLAT unit 110 may determine locations of bits within the IPv6 source address that contain the IPv4 source address. Because the IPv6 source address includes the CLAT destination prefix and CLAT unit 110 already stores data indicating the CLAT destination prefix, the length of CLAT destination prefix is available to CLAT unit 110. CLAT unit 110 may use the format specified in RFC 6052 to determine the locations of the bits within the IPv6 source address that contain the IPv4 source address. After determining the locations of the bits within the IPv6 source address that contain the IPv4 source address, CLAT unit 110 may copy out the values of the bits within the IPv6 source address that contain the IPv4 source address.

To translate the IPv6 destination address into the IPv4 destination address, CLAT unit 110 may determine locations of bits within the IPv6 destination address that contain the IPv4 destination address. Because the IPv6 destination address includes the CLAT source prefix and CLAT unit 110 already stores data indicating the CLAT source prefix, the length of CLAT source prefix is available to CLAT unit 110. CLAT unit 110 may use the format specified in RFC 6052 to determine the locations of the bits within the IPv6 destination address that contain the IPv4 destination address. After determining the locations of the bits within the IPv6 destination address that contain the IPv4 destination address, CLAT unit 110 may copy out the values of the bits within the IPv6 destination address that contain the IPv4 destination address.

CLAT unit 110 may then generate an IPv4 packet (1014). The IPv4 packet may have a source address field that specifies the determined IPv4 source address. Additionally, the IPv4 packet may have a destination address field that specifies the determined IPv4 destination address. CLAT unit 110 may generate the IPv4 packet by writing data representing the IPv4 packet to a memory according to a format specified by the IPv4 communication protocol.

CLAT unit 110 may then output the IPv4 packet (1016). For example, an IFC of a network device that implements CLAT unit 110 may output the IPv4 packet onto customer-side network 102. In another example, CLAT unit 110 may output the IPv4 packet to a memory of a network device that implements CLAT unit 110. In this example, another software process running on the network device may read the IPv4 packet. Thus, in this example, it may be unnecessary for the IPv4 packet to be transmitted to a separate device via a customer-side network.

Figure 11:
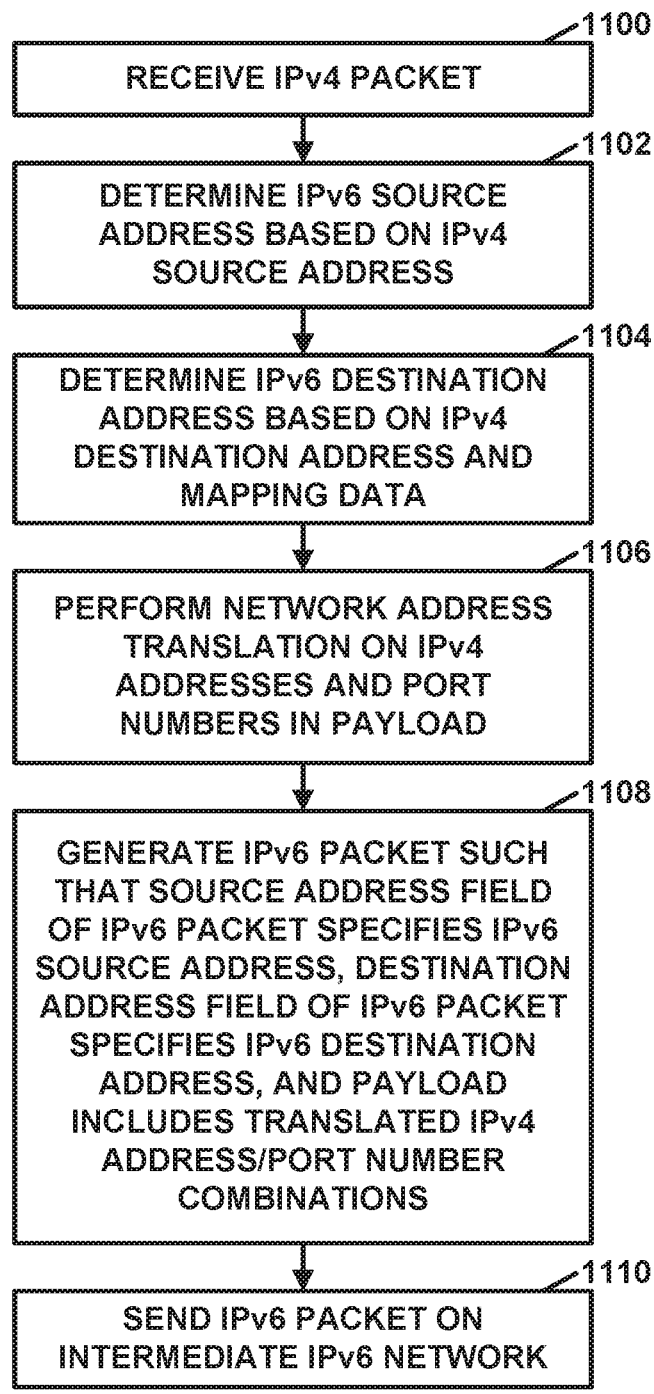
FIG. 11 is a flowchart illustrating an example IPv4 to IPv6 translation operation performed when an IPv4 packet is associated with ALG traffic, in accordance with one or more techniques of this disclosure.

FIG. 11 is a flowchart illustrating an example IPv4 to IPv6 translation operation performed when an IPv4 packet is associated with ALG traffic, in accordance with one or more techniques of this disclosure. In the example of FIG. 11, PLAT unit 112 receives an IPv4 packet (1100). In response to receiving the IPv4 packet, PLAT unit 112 may determine an IPv6 source address based on the IPv4 source address (1102). PLAT unit 112 may also determine an IPv6 destination address based on the IPv4 destination address and mapping (1104). PLAT unit 112 may perform actions (1100) through (1104) in the same way as the corresponding actions in FIG. 10.

However, in the example of FIG. 11, based on the IPv4 packet being associated with ALG traffic, PLAT unit 112 may perform network address translation on IPv4 addresses and port numbers in a payload of the IPv4 packet (1106). In some examples, PLAT unit 112 may identify ALG traffic based on the transport protocol (e.g., TCP/UDP), the destination and/or source port numbers, which may be custom configured. In some examples, to perform the network address translation, PLAT unit 112 may, as mentioned above with respect to FIG. 9, store a NAT table (e.g., NAT table 418) that includes NAT entries in a memory (e.g., memory 403). Each NAT entry may specify a first IPv4 address/port number combination and a second IPv4 address/port number combination. In this example, for each IPv4 address/port number combination in the payload of the IPv4 packet for which PLAT unit 112 is to apply NAT, PLAT unit 112 may scan through the NAT table searching for a NAT entry that specifies the IPv4 address/port number combination in the payload of the IPv4 packet as a second IPv4 address/port number combination. In response to identifying a NAT entry that specifies the IPv4 address/port number combination in the payload of the IPv4 packet as the second IPv4 address/port number combination, PLAT unit 112 may replace the IPv4 address/port number combination in the payload of the IPv4 packet with the first IPv4 address/port number combination specified in the identified NAT entry. PLAT unit 112 may replace the IPv4 address/port number combination in the payload by overwriting the data in memory representing the existing IPv4 address/port number combination in the payload of the IPv4 packet.

PLAT unit 112 may generate an IPv6 packet such that a source address field of the IPv6 packet specifies the IPv6 source address, a destination address field of the IPv6 packet specifies the IPv6 destination address, and a payload of the IPv6 packet includes the translated IPv4 address/port number combinations (1108). PLAT unit 112 may generate the IPv6 packet by writing data representing the IPv6 packet to a memory (e.g., memory 403) according to a format specified by the IPv6 communication protocol. PLAT unit 112 may then send the IPv6 packet on intermediate IPv6 network 104 (1110). For example, an IFC of a network device implementing PLAT unit 112 may transmit the IPv6 packet on intermediate IPv6 network 104. CLAT unit 110 may process the IPv6 packet in the same manner as shown in FIG. 10.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method for performing address translation, the method comprising:
receiving, by a network device, an Internet Protocol version 6 (IPv6) packet that includes an IPv6 source address and an IPv6 destination address;
determining, by the network device, based on the IPv6 packet including an extension header that includes an address prefix option, whether to translate the IPv6 packet into an Internet Protocol version 4 (IPv4) packet;
based on a determination to translate the IPv6 packet into the IPv4 packet:
determining, by the network device, an IPv4 source address;
determining, by the network device, an IPv4 destination address based on the IPv6 destination address; and
generating, by the network device, the IPv4 packet such that a source address field of the IPv4 packet specifies the IPv4 source address and a destination address field of the IPv4 packet specifies the IPv4 destination address.

2. The method of claim 1, wherein the IPv6 packet is a first IPv6 packet and the IPv4 packet is a first IPv4 packet, the IPv4 source address is a first IPv4 source address, the IPv4 destination address is a first IPv4 destination address, the method further comprising:
based on the determination to translate the first IPv6 packet into the first IPv4 packet, generating, by the network device, an entry in a set of mapping data, wherein the entry associates the first IPv4 source address with address recovery data;
receiving, by the network device, a second IPv4 packet, wherein a source address field of the second IPv4 packet specifies a second IPv4 source address and a destination address field of the second IPv4 packet specifies a second IPv4 destination address;
determining, by the network device, a second IPv6 source address based on the second IPv4 source address;
determining, by the network device, a second IPv6 destination address based on the second IPv4 destination address and the mapping data; and
generating, by the network device, a second IPv6 packet such that a source address field of the second IPv6 packet specifies the second IPv6 source address and a destination address field of the second IPv6 packet specifies the second IPv6 destination address.

3. The method of claim 2,
wherein determining the first IPv4 source address comprises extracting, by the network device, the first IPv4 source address from the first IPv6 source address,
wherein the address recovery data specifies a customer translation (CLAT) source prefix embedded in the first IPv6 source address, and
wherein determining the second IPv6 destination address comprises:
identifying, by the network device, an entry in the mapping data that specifies the second IPv4 destination address; and
determining, by the network device, the second IPv6 destination address such that the second IPv6 destination address includes the CLAT source prefix specified by the identified entry and includes the second IPv4 destination address.

4. The method of claim 3, further comprising determining, by the network device, based on a length of the CLAT source prefix, locations of bits within the first IPv6 source address that specify the CLAT source prefix, and
wherein extracting the IPv4 source address comprises determining, by the network device, based on the length of the CLAT source prefix, locations of bits within the first IPv6 source address that specify the first IPv4 source address.

5. The method of claim 4, wherein the address prefix option specifies the CLAT source prefix.

6. The method of claim 4, the address prefix option specifies the length of the CLAT source prefix.

7. The method of claim 1, further comprising, based on the determination to translate the IPv6 packet into the IPv4 packet:
performing network address translation on payload IPv4 addresses in a payload of the IPv6 packet.

8. A network device comprising:
a network interface card configured to receive an Internet Protocol version 6 (IPv6) packet that includes an IPv6 source address and an IPv6 destination address; and
one or more processors comprising circuitry configured to:
  determine, based on the IPv6 packet including an extension header that includes an address prefix option, whether to translate the IPv6 packet into an Internet Protocol version 4 (IPv4) packet;
  based on a determination to translate the IPv6 packet into the IPv4 packet:
    determine an IPv4 source address;
    determine an IPv4 destination address based on the IPv6 destination address; and
    generate the IPv4 packet such that a source address field of the IPv4 packet specifies the IPv4 source address and a destination address field of the IPv4 packet specifies the IPv4 destination address.

9. The network device of claim 8, wherein the IPv6 packet is a first IPv6 packet and the IPv4 packet is a first IPv4 packet, the IPv4 source address is a first IPv4 source address, the IPv4 destination address is a first IPv4 destination address, the one or more processors comprising circuitry configured to:
  based on the determination to translate the first IPv6 packet into the first IPv4 packet, generate an entry in a set of mapping data, wherein the entry associates the first IPv4 source address with address recovery data;
  receive a second IPv4 packet, wherein a source address field of the second IPv4 packet specifies a second IPv4 source address and a destination address field of the second IPv4 packet specifies a second IPv4 destination address;
  determine a second IPv6 source address based on the second IPv4 source address;
  determine a second IPv6 destination address based on the second IPv4 destination address and the mapping data; and
  generate a second IPv6 packet such that a source address field of the second IPv6 packet specifies the second IPv6 source address and a destination address field of the second IPv6 packet specifies the second IPv6 destination address.

10. The network device of claim 9,
wherein the address recovery data specifies a customer translation (CLAT) source prefix embedded in the first IPv6 source address, and
  wherein the one or more processors comprise circuitry configured to:
    extract the first IPv4 source address from the first IPv6 source address,
    identify an entry in the mapping data that specifies the second IPv4 destination address; and
    determine the second IPv6 destination address such that the second IPv6 destination address includes the CLAT source prefix specified by the identified entry and includes the second IPv4 destination address.

11. The network device of claim 9, wherein the one or more processors comprise circuitry configured to:
  determine, based on a length of the CLAT source prefix, locations of bits within the first IPv6 source address that specify the CLAT source prefix, and
  determine, based on the length of the CLAT source prefix, locations of bits within the first IPv6 source address that specify the first IPv4 source address.

12. The network device of claim 11, wherein the address prefix option specifies the CLAT source prefix.

13. The network device of claim 11, the address prefix option specifies the length of the CLAT source prefix.

14. The network device of claim 8, wherein the one or more processors are configured to perform, based on the determination to translate the IPv6 packet into the IPv4 packet, network address translation on payload IPv4 addresses in a payload of the IPv6 packet.

15. A network device comprising:
one or more processors comprising circuitry configured to:
  receive an Internet Protocol version 4 (IPv4) packet that includes an IPv4 source address and an IPv4 destination address;
  determine an Internet Protocol version 6 (IPv6) source address based on a customer translation (CLAT) source prefix and an IPv4 source address of an IPv4 packet;
  determine an IPv6 destination address based on a CLAT destination prefix and an IPv4 destination address of the IPv4 packet;
  generate an IPv6 packet having a source address field, a destination address field, and an extension header, wherein the source address field of the IPv6 packet contains the IPv6 source address, the destination address field of the IPv6 packet contains the IPv6 destination address, and the extension header includes an address prefix option specifying the CLAT source prefix or a length of the CLAT source prefix; and
a network interface card configured to send the IPv6 packet on an IPv6 network.

* * * * *